Oct. 3, 1961    H. TRAMM ET AL    3,002,871
WELDING THERMOPLASTIC BODIES TOGETHER
Filed Sept. 16, 1957
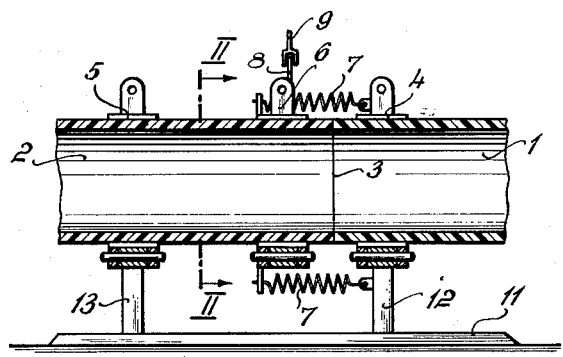
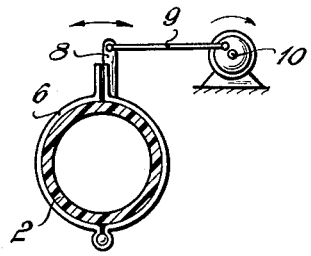
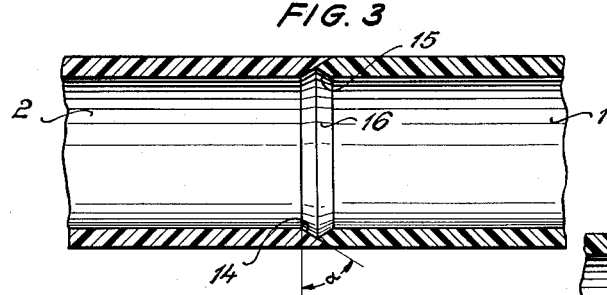
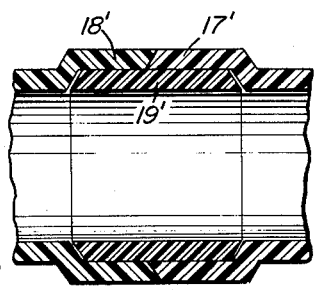
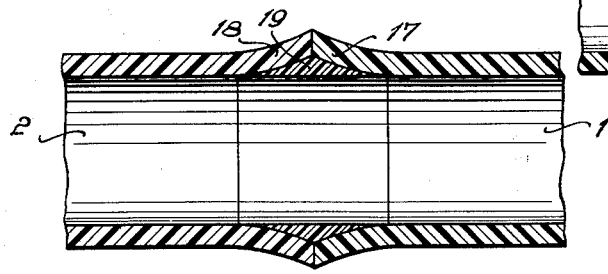
INVENTORS:
HEINRICH TRAMM, FRANZ SCHAUB, HEINZ-RUDOLF RUGGEBERG
By Burgers, Dinklage & Sprung
ATTORNEYS United States Patent Office
3,002,871
Patented Oct. 3, 1961

3,002,871
WELDING THERMOPLASTIC BODIES TOGETHER
Heinrich Tramm, Mulheim-Speldorf, and Franz Schaub and Heinz Rudolf Rüggeberg, Oberhausen-Holten, Germany, assignors to Ruhrchemie Aktiengesellschaft, Oberhausen-Holten, Germany
Filed Sept. 16, 1957, Ser. No. 684,156
Claims priority, application Germany Sept. 22, 1956
9 Claims. (Cl. 156—73)

This invention relates to new and useful improvements in the welding of thermoplastic bodies together.

Bodies of thermoplastic material, as for example, of polyvinyl chloride, polyamides, polyurethanes, polystyrene or polyethylene may be welded together by heating the surfaces to be joined to at least their softening temperature, and pressing the same together. The process is applicable to any thermoplastic material capable of being worked by welding. It may be used especially for polyethylenes of various molecular weights as, for example, for polyethylenes having molecular weights of 20,000–1,000,000 without changing the working conditions. The heating is conventionally effected by means of an external source of heat, as for example, by means of a torch, an electric heating element, or the like, though it has been suggested to supply this heat as frictional heat produced by rotating one of the bodies to be joined in frictional contact with the other. This mode of operation is generally only applicable to bodies having a cylindrical shape, in connection with which one of the bodies is clamped to a rotating device, as for example, the face plate of a lathe, while the other is held firmly with a slight pinched fit, and pressed against the rotating part. Due to the frictional heat evolved, the rotating part will adhere with sufficient tightness to the other part, after a short time so that the latter will be carried along in the rotation.

This type of rotary frictional welding is, in practical operation, limited to pipes and other cylindrical bodies of a relatively small length, which may be conveniently rotated. Furthermore, this type of welding requires a lathe or other rotary machine tool, so that operation in the field is not practical. Additionally, it is not possible to obtain a predetermined rotation alignment of the welded part as the point at which the parts will adhere and rotate together cannot be accurately predicted or controlled. For this reason, it is not possible to obtain the desired relative position, with respect to pipe nozzles, projections or bores, provided on the pipes or cylindrical parts which are welded together. The rotary frictional welding process is not at all applicable in effecting the longitudinal connection of plates, rods or profiles, or for making complicated or difficultly accessible connections.

One object of this invention, is a welding process and apparatus, utilizing frictional heat which overcomes the above mentioned disadvantages of the rotary frictional process. This, and still further objects will become apparent from the following description, read in conjunction with the drawing, in which:

FIG. 1 is a diagrammatic vertical section of an embodiment of a welding apparatus in accordance with the invention, FIG. 2 is a diagrammatic cross section of the embodiment shown in FIG. 1, FIG. 3 is a vertical section showing the preparation of pipe ends for welding in accordance with the invention and, FIG. 4 is a vertical section showing a further embodiment of the preparation of the pipe ends for welding in accordance with the invention.

FIG. 5 is a vertical section showing a still further embodiment of the preparation of the pipe ends for welding in accordance with the invention.

In accordance with the invention, the welding of the bodies of thermoplastic material together, is effected by rubbing the surfaces of the bodies to be welded together in frictional contact with an oscillatory motion to thereby produce sufficient frictional heat for the welding. Relatively low oscillation amplitudes of, for example, 0.2–10 mm. are sufficient for this purpose with frequencies of oscillation of about 10 to 100 cycles per second being preferred, though, of course, higher frequencies may be used. Thus, it is also possible to use a mechanical driving device with which frequencies above the range mentioned above are reached. The pressure used in pressing the sections together may range between 2 and 40 kg./sq. cm. and is preferably 5–10 kg./sq. cm. In this manner, a sound welded joint may be produced in a relatively short period of time, as for example, 10 to 60, and preferably 15 to 30 seconds. The oscillatory motion may be a rotary oscillatory motion, a transverse oscillatory motion, longitudinal oscillatory motion, or any combination of these motions.

In connection with welding together cylindrical objects and in particular pipes (the term pipes being generically used to designate any tubular members and conduits), the pipes are preferably maintained in axial alignment at the portions to be joined and the pipe ends to be welded together are rubbed in frictional contact with a rotary oscillatory motion. This rotary oscillatory motion causes relative motion of the surfaces to be joined in a direction substantially parallel thereto. It is preferable that the ends of the pipes or sections are beveled before welding them together, using an angle of bevel α (see FIG. 3), for example, about 30 to 60°. The pipe ends alternately may be expanded or flared at their edges to be joined and backed by annular reinforcement piece or sleeve, maintained on the inside of the pipe surface at the joint, this latter procedure being preferred in the thin-walled pipes.

Referring to the embodiment shown in the drawing, the two pipe ends 1 and 2 of pipes constructed of thermoplastic material, as, for example, polyvinyl chloride, polyamides, polyurethanes, polystyrene or polyethylene, are pressed together at 3 forming an annular butt joint. The pipe 2 is held firmly by a hinged pipe clamp 5, which is connected to the base 11, by means of the leg of 13. The clamp 5 is positioned at a distance from the butt joint 3 at which the weld is to be formed. The pipe length 1 is held firmly in place by means of the pipe clamp 4, which is mounted on the base 11 by means of the leg 12. The clamp 4 is positioned adjacent to the butt joint 3. A ring clamp 6 is connected to the pipe section 2, adjacent to the butt joint 3. This ring clamp 6 is connected to the clamp 4, by two or three springs 7, which press the pipe sections 1 and 2 firmly together at the butt joint 3, in frictional contact. The ring clamp 6 has two hinged parts which may be easily snapped around the pipe section, engaging the same and has a lever arm 8, connected thereto. A connecting rod 9, pivotly connects the lever arm 8 to a crank arm 10 rotated by an electric motor so that as the motor rotates the lever arm 8 is pulled back and forth, causing the ring clamp 6 and the portion of the pipe section 2 held thereby to effect a rotary oscillating motion. In view of the small amplitude of oscillation and the distance of the clamp 5 from the butt joint 3 and the ring clamp 6 and the flexibility of the pipe, this rotary oscillatory motion may be imparted despite the firm holding of the pipe 2, by the clamp 5. The end of the pipe section 2, which is held by the ring clamp 6, thus performs rhythmic oscillations in the manner of a tuning fork. It is desirable that the distance between the clamp 5 and the butt joint 3, is so chosen that the same has a natural frequency of vibration for rotary oscillations which is in resonance with the driving frequency from the motor 10.

It is particularly advantageous in practical operations, that only the end of the pipe section 2 is imparted with the rotary oscillatory motion, while the remainder of the pipe section is maintained stationary. When a sufficiently high oscillating drive is caused by the motor 10, as for example, with a frequency 10 to 100 cycles per second, and an amplitude of 0.2 to 10 mm., the frictional rubbing at the butt joint 3, will generate sufficient heat for a sound weld within a relatively short period of time, as for example, 10 to 60 and preferably 15 to 30 seconds, so that a tight connection and a sound weld of the two pipe sections 1 and 2 is obtained. After removing the clamps 4, 5, and 6, by removing the appropriate screws or the like, the pipe may be very easily removed, and new pipe section easily inserted in the device for welding.

The driving motor for the crank arm 10, may be mounted on the base 11, and/or may be permanently connected by means of the connecting rod 9 to the lever 8. With such construction, the apparatus comprises an extremely handy and portable apparatus for welding plastic pipes. The clamps 4, 5, and 6 may be easily adapted, or easily exchanged, for pipes of different diameter.

In place of the electric motor any suitable rotary driving device may be used, as for example, a pneumatic motor, an internal combustion engine, and even a manually operative motor driven by a hand crank through a suitable gear arrangement, or driven by a clockwork which is manually wound.

As shown in FIG. 3, one of the pipe ends to be welded is provided with the bevel 14 on its inner edge, while the other pipe end is provided with a bevel on its outer edge, which mates with the bevel 14, and additionally with a bevel 15 on its inner edge, which forms the V-shaped groove 16, with the bevel 14. The V-shaped annular groove 16, may fill with partially molten or squeezed out thermoplastic material during the welding operation, in order to effect a strong joint. The angle $\alpha$ of the bevels are preferably between about 30 and 60°.

In the embodiment, as shown in FIG. 4, the ends of the pipes to be joined are flared outwardly at 17 and 18, and an internal sleeve 19, positioned in this flared out portion at the joint. The sleeve 19 has an outer surface which corresponds to the flared surface at the butt joint formed by pressing 17 and 18 together. FIG. 5 shows an embodiment in which the sleeve 19' is of cylindric shape and the pipe ends 17' and 18' are correspondingly flared outwardly.

It is preferable to use the same material for the sleeve and for the pipes, however, in case of relatively soft pipe material, the sleeve may be made of a harder plastic material or of metal. The material of the sleeve need not be weldable. For example, in case of pipe connections of soft polyvinyl chloride or soft polyethylene, the sleeve may be made of rigid polyvinyl chloride or rigid polyethylene or also of a hard duroplastic material.

In this manner an absolutely tight pressure resistant weld is obtained, which is particularly suitable in the case of thin-walled pipes.

For the first time, in accordance with the invention, the welding of thermoplastic materials by frictional heat with its great inherent advantages, becomes generally applicable. This welding procedure has a substantial advantage in that it can be performed in a short time, requires no external heat sources, such as gas torches, electric heaters, induction apparatus, or the like.

Difficulties are often encountered in the welding of thermoplastic materials in the conventional manner, using an external source of heat. A very narrow temperature range is often required below which welding will not occur and above which deterioration of the plastic material will occur. It is extremely difficult to maintain this accurate temperature with the external source of heat. In the case of frictional welding, however, this danger does not exist, and the welding may be effected relatively easily, even by an unskilled operator, since only the frequency of the frictional motion and the force and time of pressing the parts together need be controlled. These working conditions can be relatively easily established for any type of thermoplastic material with consideration being given to the cross-section to be joined, so that satisfactory welds are insured even under difficult conditions.

The process in accordance with the invention, is of particular advantage in connection with the installation of pipe lines. The pipe connections required can be easily made by means of simple tools, even in narrow trenches and pipe channels without the prior difficulties.

The following example is given by way of illustration and not limitation:

*Example*

Two sections of high density low pressure poly-ethylene pipe, having a molecular weight of 500,000, an inside diameter of 1 inch and a wall thickness of 3 mm. were welded together. First, the ends of the pipe sections to be joined were beveled with a 40° bevel in the manner shown in FIG. 3. The pipe sections were then pressed together with moderate pressure of 7.5 kg./sq. cm. of welding surface in the apparatus shown in FIG. 1, and one of the sections rubbed in frictional contact with the other section, with a rotary oscillatory motion, caused by the electric motor driving the connecting rod 9, and having a frequency of about 50 cycles per second and an amplitude of about 2.5 mm. The clamps 4 and 6 were positioned as near as possible to the butt joint. The distance was 20 mm. each while the clamp 5 was positioned about 250 mm. from the butt joint. Within about 25 seconds a sound weld was produced at the joint. The welded joint was practically of the same strength as the unwelded material, and when the pipe was pressurized past its bursting point, the break always normally occurred outside the weld.

Products other than polyethylene also can be connected by the welding process in practically the same manner and without substantial change of the working conditions.

While the invention has been described in detail with reference to the specific embodiments shown, various changes and modifications will become apparent to the skilled artisan, which fall within the spirit of the invention and scope of the appended claims.

We claim:

1. In the process for welding together pipe sections of thermoplastic materials by means of frictional heat, produced at the surfaces to be joined together by oscillatory motion, the improvement which comprises maintaining the corresponding end portions of the pipe sections to be joined in axial alignment and frictional contact, stationarily securing the end portion of one of said pipe sections, mounting the end portion of the other of said pipe sections for oscillatory motion with respect to the remaining portion of the same pipe section while securing said remaining portion against movement, and producing at least that amount of frictional heat required to effect the welding together of the pipe sections by oscillating the pipe section end portion mounted for oscillatory motion with a rotary oscillatory motion in frictional contact with the stationarily secured pipe section end portion.

2. Process according to claim 1, in which the distance between the remaining portion of the said same pipe section secured against movement and the point of welding of the end portion mounted for oscillatory motion is so chosen that the said same pipe section has a natural frequency of vibration for rotary oscillation which is in resonance with the oscillating drive frequency.

3. Device for welding thermoplastic pipe sections together by oscillating the end portion of one pipe section in frictional contact with the end portion of the other pipe section, which comprises clamping means for maintaining two pipe sections to be joined in end-frictional contact and alignment with each other, said clamping means securing the end portion of the first of said pipe sections against movement, the end portion of the second of said pipe sections being mounted for oscillatory motion with respect to the remaining portion of the second pipe section, the remaining portion of the second pipe section being secured against movement by said clamping means, means for oscillating the end portion of the second pipe section in frictional contact with the mating end portion of the first pipe section with a rotary oscillating motion, and resilient means normally urging the end portion of the second pipe section toward the point of frictional contact.

4. Process according to claim 1 in which the end portions of the pipe sections to be joined have corresponding mating bevels with a 30–60° angle of bevel.

5. Process according to claim 1 in which said oscillatory motion is effected with a frequency of about 10 to 100 cycles per second.

6. Process according to claim 5 in which said oscillatory motion is effected with an amplitude of about 0.2 to 10 mm.

7. Process according to claim 1 in which the pipe ends to be joined are flared outwardly and which includes maintaining a sleeve in contact with the ends to be joined during said joining.

8. Process according to claim 7 in which said sleeve is an internal sleeve.

9. Process according to claim 4 in which one of the pipe ends to be joined has its inner edge beveled, the other of said pipe ends has its inner and outer edges beveled, thereby forming an internal annular V-shaped groove at the points of contact of the pipe ends.

References Cited in the file of this patent

UNITED STATES PATENTS

| 1,627,288 | Kurkowski | May 3, 1927 |
| 2,379,990 | Rembert | July 10, 1945 |
| 2,766,518 | Costanzo | Oct. 16, 1956 |
| 2,779,998 | Bailey | Feb. 5, 1957 |

FOREIGN PATENTS

| 572,789 | Great Britain | Oct. 24, 1945 |

OTHER REFERENCES

Modern Plastics, "Fabricating With Frictional Heat," November 1945, pages 142–145.

Plastics, "Fabrication by Friction," December 1945, pages 64, 66–67 and 113–115.